US012625694B2

(12) United States Patent
Gifre et al.

(10) Patent No.: US 12,625,694 B2
(45) Date of Patent: May 12, 2026

(54) AUTHENTICATION SCHEME FOR PROVIDING SOFTWARE UPDATES TO AN UPDATE AGENT

(71) Applicant: GIESECKE+DEVRIENT MOBILE SECURITY GERMANY GMBH, Munich (DE)

(72) Inventors: Clara Gifre, Barcelona (ES); David Patino, Saint Vincenc dels Horts (ES); Federico Ruau, Hospitalet de Llobregat (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 163 days.

(21) Appl. No.: 18/571,919

(22) PCT Filed: Jun. 29, 2022

(86) PCT No.: PCT/EP2022/025293
§ 371 (c)(1),
(2) Date: Dec. 19, 2023

(87) PCT Pub. No.: WO2023/274577
PCT Pub. Date: Jan. 5, 2023

(65) Prior Publication Data
US 2024/0281244 A1 Aug. 22, 2024

(30) Foreign Application Priority Data
Jun. 30, 2021 (EP) .................................... 21382577

(51) Int. Cl.
*G06F 9/44* (2018.01)
*G06F 8/61* (2018.01)
(Continued)

(52) U.S. Cl.
CPC .................. *G06F 8/65* (2013.01); *G06F 8/61* (2013.01); *H04L 9/3242* (2013.01)

(58) Field of Classification Search
CPC ........................................................ G06F 8/65
(Continued)

(56) References Cited

U.S. PATENT DOCUMENTS

2007/0235517 A1* 10/2007 O'Connor .............. G06Q 10/06
235/375
2013/0061110 A1* 3/2013 Zvibel ................. G06F 11/1004
714/E11.03
(Continued)

OTHER PUBLICATIONS

GSM Association, "Official Document SGP.22-SGP.22 RSP Technical Specification", Jun. 5, 2020, 268 pages, [online] [retrieved on Aug. 29, 2025]. Retrieved from <https://www.gsma.com/esim/wp-content/uploads/2020/06/SGP.22-v2.2.2.pdf> (Year: 2020).*
(Continued)

*Primary Examiner* — Evral E Bodden
(74) *Attorney, Agent, or Firm* — Workman Nydegger

(57) ABSTRACT

A method, an update agent and an off-card entity are provided for implementing an authentication scheme for providing a software image to a secure element. An installation package includes a package binding function for linking the installation package to the secure element, a manifest, a manifest signature generated using a block-cipher algorithm, and a software image is received at an update agent within the secure element. The update agent implements an authentication and integrity scheme by verifying various signatures contained within the installation package and installing the software image in case of successful authentication and integrity verification.

10 Claims, 6 Drawing Sheets

(51) Int. Cl.
*G06F 8/65* (2018.01)
*H04L 9/32* (2006.01)

(58) Field of Classification Search
USPC .......................................................... 717/168
See application file for complete search history.

(56) References Cited

U.S. PATENT DOCUMENTS

2016/0092701 A1\*  3/2016  Shah ........................ H04W 4/60
713/189
2018/0082065 A1\*  3/2018  Liu ........................ H04L 9/3247

OTHER PUBLICATIONS

Extended European Search Report from corresponding EP Application No. 21382577.1, Dec. 14, 2021.
International Search Report from corresponding PCT Application No. PCT/EP2022/025293, Oct. 13, 2022.
V Gsma et al.: "GSM Association Non-confidential Official Document SGP.22-SGP.22 RSP Technical Specification", Version 2.2.2, Jun. 5, 2020, 268 pages.
GSM Association, "Non-Confidential Official Document SGP.02—Remote Provisioning Architecture for Embedded UICC—Technical Specification—Version 3.1", May 27, 2016, 297 pages.

\* cited by examiner

501

SW image

S1  Combining the software image with a manifest and a manifest signature to obtain the payload part of the installation package S2  Providing a package binding function within the header part to link the installation package to the secure element S3  Transmitting the installation package to an update agent on the secure element

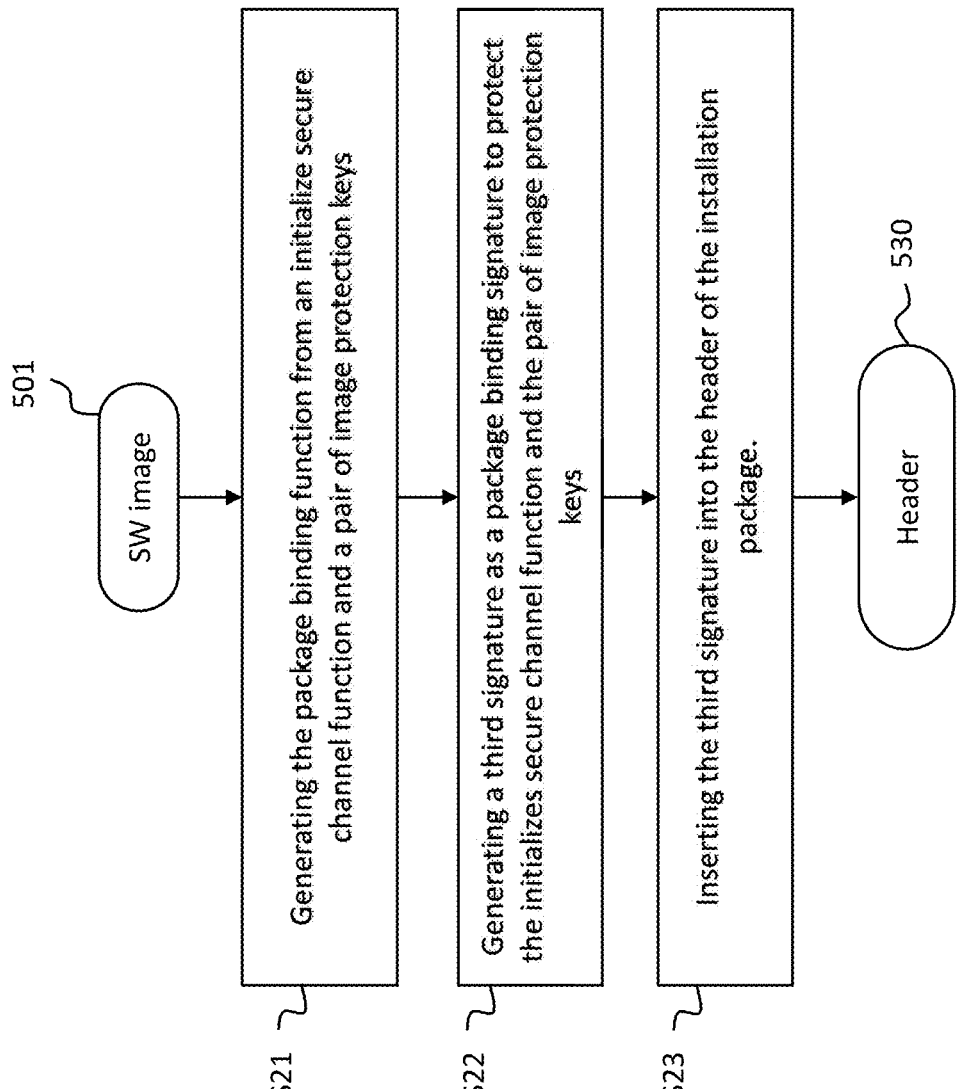

501 SW image

S21 Generating the package binding function from an initialize secure channel function and a pair of image protection keys S22 Generating a third signature as a package binding signature to protect the initializes secure channel function and the pair of image protection keys S23 Inserting the third signature into the header of the installation package.

530 Header

Fig. 5

AUTHENTICATION SCHEME FOR PROVIDING SOFTWARE UPDATES TO AN UPDATE AGENT

The present invention relates to updating a piece of software, such as an operating system, on a secure element, and more particularly, to a method, an update agent and an off-card entity for implementing an authentication scheme for providing a software image to a secure element.

BACKGROUND OF THE INVENTION

Recently, mobile devices configured to employ electronic subscriber profiles for communicating on mobile networks have emerged. Such mobile devices are typically equipped with smart cards containing electronic/embedded Secure Elements (SE), such as electronic/embedded universal integrated circuit cards (cUICCs), smartSD, or smart microSD, to name a few.

A secure element is a tamper resistant element, TRE, that provides a secure memory and execution environment within a smart card/device in which application code and application data can be securely stored and administered. The secure element ensures that access to the data stored on the card is provided only when authorized.

A secure element designed to be used in telecommunication products, such as mobile devices, is configured to store one or more electronic subscriber profiles, in particular electronic subscriber identification module (eSIM) profiles, that may allow mobile devices to connect to one or more mobile networks. A subscriber profile (e.g., eSIM profile) may be generated by a mobile network operator (MNO) and may be downloaded to a mobile network device. The subscriber profile may then be installed on the secure element of the mobile device and used for communication over a corresponding mobile network by the mobile device.

Historically, a secure element's software does not vary once it has surpassed the production phase. This means that if any problem is found that is related to the software within it (new attacks or vulnerabilities, new updates on sector specification, the expected life cycle of the devices using it), the only possible action is to change the whole secure element. This makes it particularly difficult to keep up to date with the market needs in terms of production (with software updates after production being impossible), especially when the production is bound to be executed within a certified environment in the factory.

The GSMA remote provisioning architecture (c.f., SGP.22 RSP Technical Specification, Version 2.0, issued by the GSM Association—in the following referred to as GSMA RSP 22) provides a platform for implementing a procedure to load software onto a secure element (SE) or Tamper Resistant Element (TRE). The GSMA platform allows to implement a change in the profiles stored in the secure element by providing to the secure element a Bound Profile Package containing profile updates.

To ensure integrity of the Bound Profile Package, the GSMA remote provisioning architecture implements an authentication and encryption scheme based on the SCP03t algorithm. The scheme requires several exchanges between the TRE and the server before it can prepare a Bound Profile Package that contain the profiles used for the load, which might not be optimal for a broadcast deploy of a new piece of software.

Furthermore, the GSMA platform does not allow for implementing a change in the basic software present in the SE/TRE, such as for instance a change of an operating system, as the security scheme provided lacks extra layers of protection which might be required for the deployment of critical data such as a new operating system.

Some of the uses of the download/update security schemes might require to be as fast as possible for several reasons. Some examples might be the need to apply this to several targets on a production line, or having a constraint due to this process being allocated inside another one, like the secure element being updated as part of a device update, and the manufacturer of the device setting such restriction.

Recently, remote provisioning capabilities for supporting operating system updates onto secure elements during field deployment have been put forward. Such solutions require however a large footprint on the side of the secure element for implementing the update process, which makes them difficult to be adopted within small chips architectures.

It is therefore desirable to provide a solution for secure software remote provisioning, which is efficient in terms of performance and memory consumption and which can be implemented with a small hardware footprint.

SUMMARY OF THE INVENTION

The present invention addresses the above object by the subject-matter covered by the independent claims. Preferred embodiments of the invention are defined in the dependent claims.

According to a first aspect of the present invention, there is provided a method performed by an off-card entity for generating an installation package, comprising a header part and a payload part, for providing a software image to a secure element. The method comprises combining the software image with a manifest and a manifest signature, as a first signature, to obtain the payload part of the installation package, and providing a package binding function within the header part to link the installation package to the secure element, wherein the manifest signature is generated using a block cipher algorithm.

The expression "software image" refers to a generic data format encapsulating a software version and cryptographic data to be used by an update agent within a secure element. A software image can be an image of an operating system, but also an image of an applet or other application to be installed onto the secure element. Additional information on the software image to be uploaded, in particular information for authenticating the software image and/or authenticating an issuer of the image, are stored within the manifest. The manifest is protected by the manifest signature, in particular, the manifest signature is attached to the manifest and is used for authentication purposes. Using the manifest signature, the secure element may verify the authenticity of the off-card entity sending the installation package.

The proposed method provides thus an efficient and secure solution for authenticating the provider of software updates by the receiving secure element. Employing a block cipher based signature for authenticating both the software image and the sender facilitates hardware implementations with smaller footprint, while at the same time achieving high speeds with low cost and low latency. Applications embedded within small chip architectures that require high data throughput can benefit from these implementations.

In some embodiments of the present invention, the manifest signature is generated using a Message Authentication Code, MAC, algorithm based on a symmetric key block cipher. An example of such an algorithm is the cipher-based MAC, abbreviated as CMAC, as defined by the National Institute of Standards and Technology Special Publication 800-38B. CMAC is based on an approved symmetric key block cipher, such as the Advanced Encryption Standard (AES) algorithm.

Using a cipher-based MAC for generating the manifest signature provides strong assurance of data integrity, and allows on the secure element side efficient detection of intentional, unauthorized modification of the data as well as accidental modifications.

Preferably, the generated manifest signature is composed of 16 bytes.

Using a single CMAC signature to protect the entire manifest has the advantage that no initial MAC chaining value is needed, simplifying thus the authentication procedure both at the off-card entity as well as on the secure element side. In particular, the secure element does not need to generate the initial MAC chaining value upon receiving the installation package, as opposed to the case when a conventional profile download and installation scheme is used.

In some embodiments of the present invention, the method further comprises generating a second signature for protecting the payload part and inserting the second signature in the manifest.

Using a further signature inside the manifest for protecting the entire payload of the installation package provides for stronger authentication and increase the assurance for the integrity of the received payload.

Preferably, the second signature is obtained by calculating a checksum over the payload.

Using a checksum calculation provides the advantage of allowing to detect multiple errors within the payload and that a checksum is easy to implement. On the side of the receiving secure element this contributes further to reducing the footprint.

Preferably, the second signature is a SHA-256 digest. Using a 256-bit key is much more secure than other common hashing algorithms.

In some embodiments of the present invention, the package binding function comprises an initialize secure channel function for opening a communication session with the secure element and a pair of image protection keys for software image encryption.

In some embodiments of the present invention, a third signature is generated as a package binding signature to protect the initializes secure channel function and the pair of image protection keys, wherein the third signature is inserted into the header of the installation package.

Preferably, the third signature is a cipher-based Message Authentication Code, MAC, generated using a MAC algorithm based on a symmetric key block cipher.

As with the first signature, using a cipher-based MAC for generating the third signature provides strong assurance of the integrity of the initializes secure channel function and the image protection keys, and allows on the secure element side efficient detection of intentional, unauthorized modification as well as accidental modifications of the initializes secure channel function and the image protection keys.

Preferably, the generated third signature is composed of 16 bytes. As with the first signature, no initial MAC chaining value is needed, simplifying thus the authentication procedure both at the off-card entity as well as on the secure element side. In particular, the secure element does not need to generate the initial MAC chaining value upon receiving the installation package, as opposed to the cased when a conventional profile download and installation scheme would be used.

In some embodiments of the present invention, the initialize secure channel function comprises a plurality of parameters, including at least a host cryptogram for verifying the communication session established between the off-card entity and the secure element.

Providing the host cryptogram to the secure element with the initialize secure channel function allows for verification of the communication session establishment and provides thus authentication for both entities, that is, the off-card entity and the secure element.

In some embodiments of the present invention, the initialize secure channel function comprises an initial counter value for implementing a protection scheme for the software image, wherein the initial counter value is an initial MAC chaining value if the protection scheme is implemented based on a SCP03t algorithm, or wherein the initial counter value is an initial counter block value if the protection scheme is implemented based on a AES GCM algorithm.

According to a second aspect of the present invention, there is provided an update agent for use in a secure element to install a software image within the secure element. The update agent is configured to receive through a communication session established with an off-card entity an installation package comprising an initialize secure channel function, a manifest, a manifest signature and a software image; to authenticate the communication session by verifying a host cryptogram within the initialize secure channel function; and to verify integrity of the software image if the communication session has been authenticated, or to return an error message otherwise.

In some embodiments of the present invention according to the second aspect, the update agent is configured to unwrap the manifest, verify the manifest signature, and reject the software image in case of signature mismatch.

In some embodiments of the present invention according to the second aspect, the update agent is further configured to calculate a checksum over the received software image and to compare the calculated checksum with a signature, in particular the second signature, extracted from the manifest. Preferably, the update agent rejects the software image in case of signature mismatch.

Preferably, the update agent is configured to accept the software image to be installed on the secure element if the first signature and/or the second signature have been successfully verified.

By configuring the update agent for implementing the security scheme as described above, an efficient authentication and integrity check can be implemented within the update agent, reducing thus the memory footprint of the update agent.

According to a third aspect of the present invention, there is provided a server, in particular a subscription manager data preparation server, configured to provide protected software updates to a secure element through an installation package, the server being configured to generate the installation package from a software image by combining the software image with a manifest and a manifest signature, to obtain the payload part of the installation package, wherein the manifest signature is generated using a block cipher algorithm; providing a package binding function within the header part to link the installation package to the secure element; and transmitting the installation package to an update agent on the secure element.

In some embodiments of the present invention according to the third aspect, the server is configured to perform the method according to the first aspect.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which:

FIGS. 4 and 5 show implementations of the steps of the method of FIG. 3 according to preferred embodiments.

DETAILED DESCRIPTION

Figure 1:
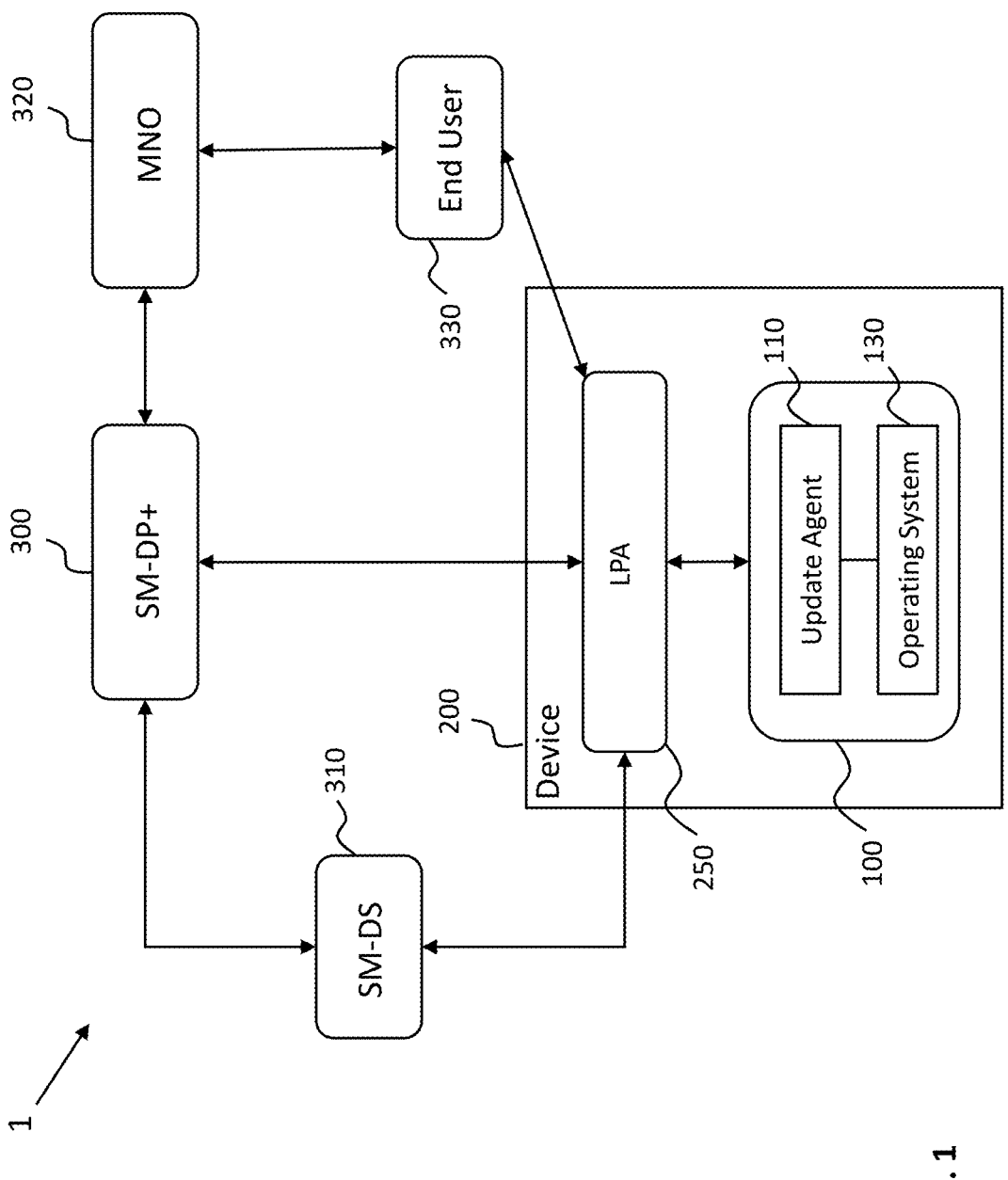
FIG. 1 shows a simplified representation of a remote eSIM provisioning system according to an embodiment.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an exemplary architecture of a SM-DP+ based system 1, in accordance with certain embodiments of the present invention. The architecture is an adaptation of the GSMA architecture described in SGP.22 RSP Technical Specification, Version 2.0, issued by the GSM Association (in the following referred to as GSMA RSP 22). The eSIM provisioning system 1 is organized around several elements: the SM-DP+ (Subscription Manager—Data Preparation and Secure Routing, 300), the SM-DS (Subscription Manager—Discovery Server, 310), the LPA (Local Profile Assistance, 250) and the eUICC or secure element, 100, the latter being part of a mobile device 200, of an end user 330.

The SM-DP+ 300 is responsible for the creation, download, remote management (enable, disable, update, delete) and the protection of subscriber profiles provided by the MNO 320. In particular, the SM-DP+ 300 may be configured to provide a profile in a Bound Profile Package or Bound Installation Package, and enable the Bound Profile/ Installation Package to be securely transmitted.

The LPA (Local Profile Assistant, 250) is a set of functions in the device 200 responsible for providing the capability to download (encrypted) profiles to the eUICC/TRE/ SE 100. It also presents the local management end user interface to the end user 330 so they can manage the status of profiles on the eUICC/TRE/SE 100.

The SM-DS 310 provides means for the SM-DP+ 300 to communicate with the eUICC/TRE/SE 100.

The external device 200 may describe an entity which is in control and communicates with the SE 100. It can be a mobile terminal, or whatever device it is that the SE is mounted on.

The update agent 110 is the entity within the secure element 100 (separated from the OS 130) in charge of receiving an installation package and performing the software update. The update agent is loaded onto the secure element or TRE together with an (initial) Operating System (OS, 130 in FIG. 1), during the factory production of the secure element 100. Initially, the OS 130 is assumed to be in control, meaning it is the OS which is executed when the TRE 100 boots.

The update agent 110 may contain at least one memory structure or region, to store sensible data thereon, such as cryptographic keys used by the update agent to authenticate and verify integrity of the received installation package.

Figure 2:
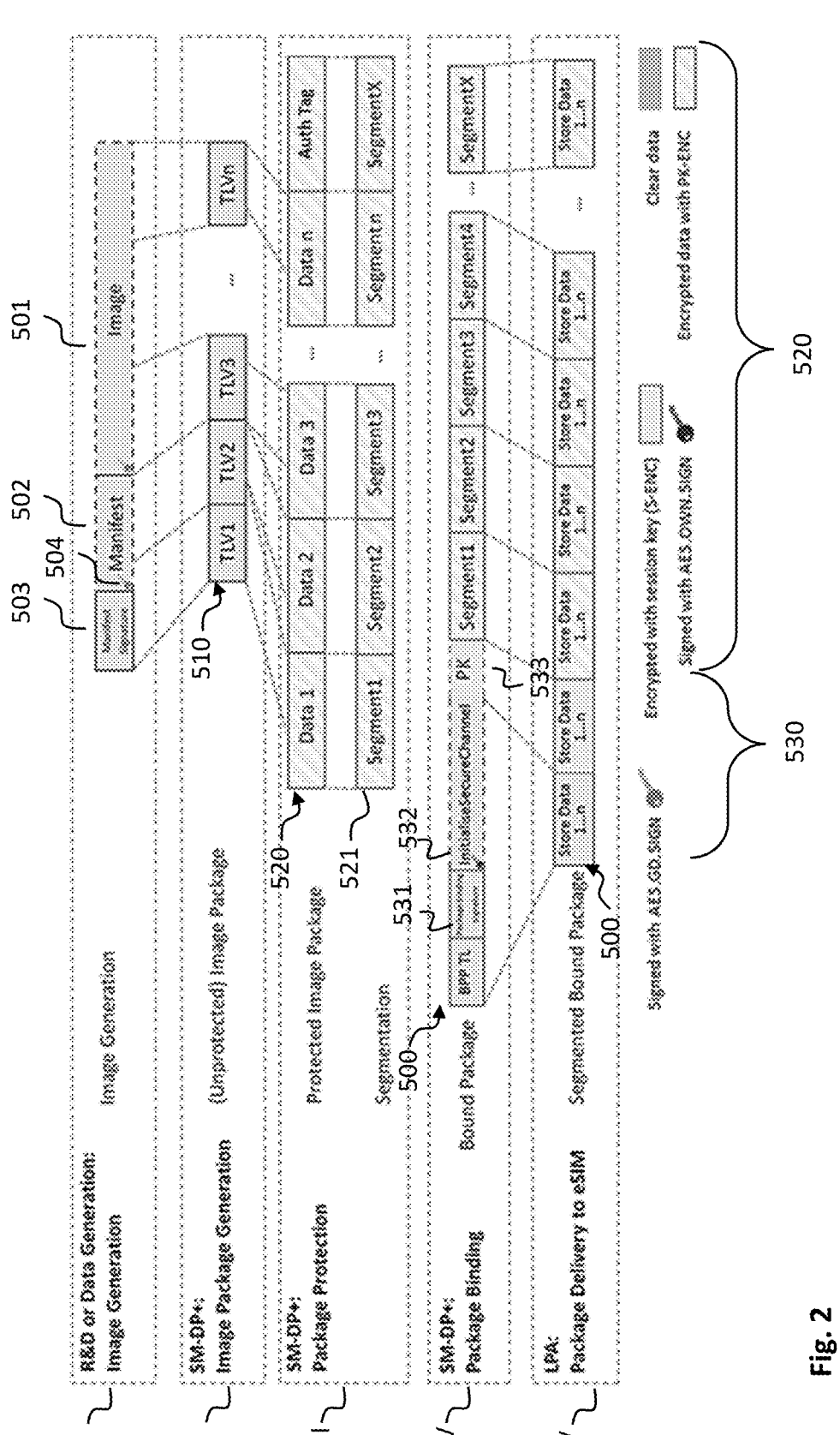
FIG. 2 shows a security scheme for performing software/ OS update on the eSIM provisioning system of FIG. 1 according to an embodiment.

FIG. 2 shows a software update security scheme to provide a software image (e.g., operating system, OS, image) through a bound installation package (for short, installation package) to the secure element 100 of FIG. 1. The scheme to provide the software image for the update adapts the general scheme known from GSMA RSP 22 to the architecture of FIG. 1.

The diagram in FIG. 2 illustrates the various formats a profile package will take from its generation to being download onto the secure element. In particular, the profile package is created in several stages I to V beginning with the software image by performing several operations such as prepending and segmentation.

In the first stage I, the image 501, provided by an image issuer, is prepended with a manifest 502 and a manifest signature 501. The manifest 502 contains information pertaining to the new software image to be uploaded and ensures the image is acceptable and the issuer is trusted. The manifest signature 503 protects the entire manifest package 502. The resulted block contains clear data that is not encrypted yet.

In stage II, the SM-DP+ 300 may generate, from the image generated in stage I, an unprotected image package containing a sequence of profile element TLVs (Tag Length Values) TLV1, . . . , TLVn, 510. Preferably, the structure of the TLVs are in accordance with the SIMalliance eUICC Profile Package: Interoperable Format Technical Specification V2.0.

In stage III, the SM-DP+ 300 may generate from the unprotected image package, a protected image package, by applying TLV encryption and MACing. These operations may preferably follow the scheme described in GSMA "Remote Provisioning of Embedded UICC Technical specification" V3.1. Preferably, TLV encryption is done by applying a private profile protection key PK-ENC, generated by the SM-DP+ 300. The resulting data block is split into segments 1 to X, 521.

In stage IV the SM-DP+ 300 may generate a bound package (or installation package) 500, by linking or binding the protected image package obtained in stage III to a particular eSIM/eUICC. This is done via a key agreement between the eSIM and the SM-DP+. Through this application the expression installation package may refer to a package which binds or links the image to be installed to a particular eSIM respectively eUICC.

Finally, in stage V the installation package 500, with header part 530 and data-carrying part 520, is segmented into blocks, and delivered to the update agent 110 on the eSIM or secure element 100. Preferably, the segments are sent via STORE DATA commands.

Figure 3:
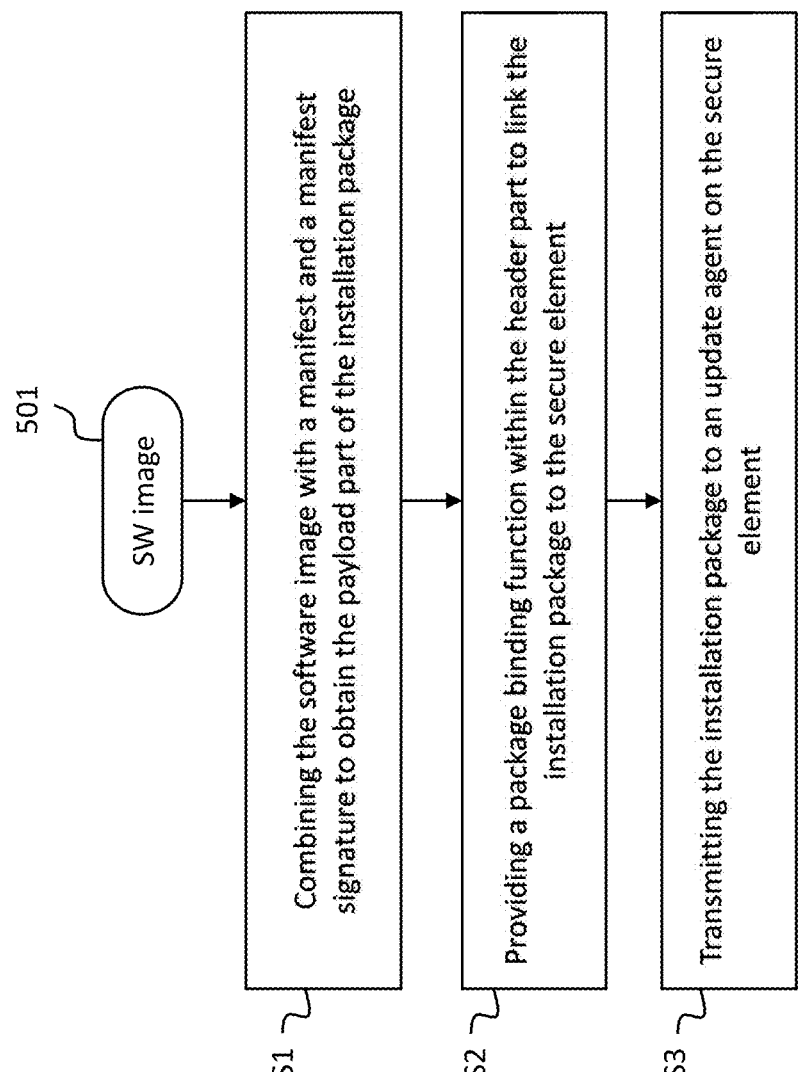
FIG. 3 shows a flow chart of a method for generating an installation package for providing a software image to a secure element according to an embodiment.

The installation package 500 with the overall structure depicted in FIG. 2 may be generated by the method depicted in FIG. 3, according to a preferred embodiment. The method may be implemented by an off-card entity, such as the SM-DP+ server 300 or the LPA 250 of the device 200 from FIG. 1

With reference to FIG. 3, in a first step the off-card entity may combine the software image 501 with a manifest 502 and a manifest signature 503, to obtain the payload part 520 of the installation package 500. In a further step, S2, a package binding function is inserted within the header part 530 of the installation package 500 to link the installation package 500 to the particular secure element 100, the installation package is to be delivered to. Finally, in step S3 the installation package 500 is transmitted to the update agent 110 located on the secure element 100.

The scheme in FIG. 2 uses several cryptographic keys and signatures for implementing authentication and encryption through the various stages, which have been particularly designated for saving footprint at the update agent and thus allowing the scheme to be efficiently implemented within small chip designs.

Notably, the main change for this scheme is the dispense with ECC cryptography, keeping only AES for use during the download. The overall structure of the delivery package is the same as for instance implemented within the GSMA Remote Provisioning Architecture, however the signatures and the format of the Initialize Secure Channel and the Protection Keys TLV are different.

Figure 4:
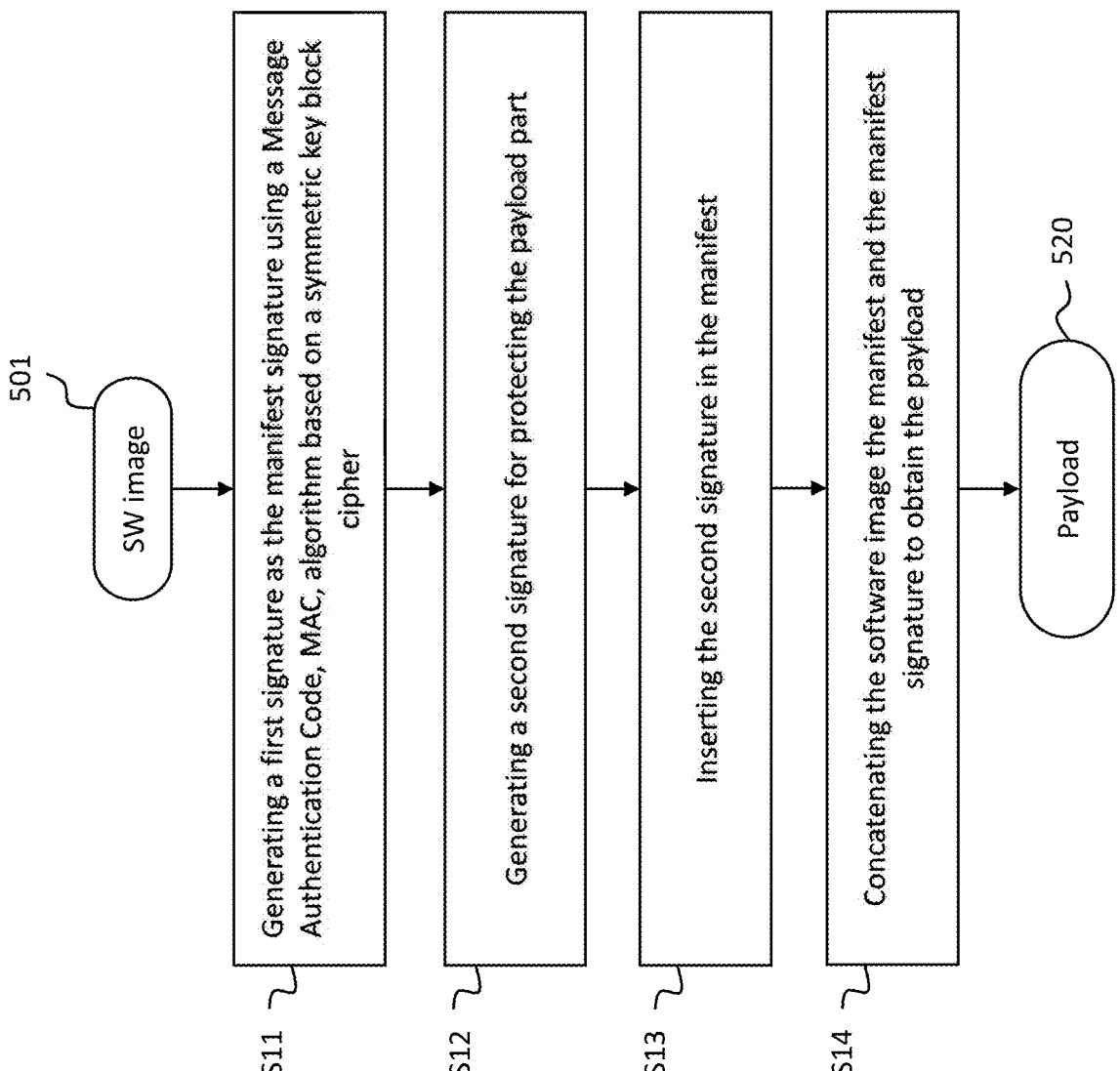

These main differences are reflected in FIGS. 4 and 5, which show implementations of the steps S1 and S2 of the method of FIG. 3 according to preferred embodiments.

In particular, the manifest signature 503, that is, the first signature that protects the entire manifest package 502, is generated in step S11 in FIG. 4 using a Message Authentication Code, MAC, algorithm based on a symmetric key block cipher. That is, a MAC is used as signature generated using the NIST CMAC calculation [NIST 800-38B]. The resulting signature is composed of 16 bytes. No Initial Chaining Value is used (so, a 00 buffer must be used).

The manifest signature 503 is attached to the manifest 502 and it is verified at the secure element 100 when the manifest

502 is completely unwrapped by the eUICC (UASD will be the one responsible for this task). In case of signature mismatch the image update is rejected. This procedure is described in details further below in connection with the embodiment of FIG. 6.

A further modification concerns the structure of the manifest 502. In particular, a second signature 504 may be generated in step S12 of FIG. 4, and used for protecting the whole payload 520 of the installation package 500. The second signature 504 may be inserted in step S13 into the manifest block, that is, into the segment of the installation package containing the manifest 502.

Preferably, the second signature 504 is generated by calculating a checksum over the payload part 520. This allows the update agent to detect multiple errors within the payload. In addition, as the checksum calculation is easy to implement, the footprint within the update agent is reduced.

The second signature may be a SHA-256 digest or another hashing function. Using a 256-bit key has the advantage of increased security over other common hashing algorithms.

By concatenating the manifest 502, including the second signature 504, with the manifest signature 503 and the software image 501 in step S14 in FIG. 4, step S1 in FIG. 3 is completed and the payload 520 is obtained.

Once the software image has been installed at the secure element, the checksum is calculated and compared to the one received. This procedure is described in details further below in connection with the embodiment of FIG. 6.

A preferred implementation of step S2 in FIG. 3 is depicted by the flow chart of FIG. 5, which shows further modification of the security scheme according to the present invention over the conventional security schemes of the GSMA RSP 22 Specification.

With reference to FIG. 5, the off-card entity 300 may generate in step S21 the package binding function from an initialize secure channel function and a pair of image protection keys. The initialize channel function may be used for opening a communication session with the secure element 100.

Optionally, the off-card entity may generate in step S22 a third signature as a package binding signature 531 to protect the initialize secure channel function and the pair of image protection keys, and insert the third signature 531 into the header 530 of the installation package 500 in step S23.

Preferably, the third signature is a cipher-based Message Authentication Code, MAC, generated using a MAC algorithm based on a symmetric key block cipher, as for instance using the NIST CMAC calculation [NIST 800-38B]. The resulting signature in this latter case is composed of 16 bytes. No Initial Chaining Value is used (so, a 00 buffer must be used).

A further adaptation of the authentication and encryption scheme according to a preferred embodiment is related to the definition of the data objects for the InitialiseSecureChannel Request. Notably, the scheme may comprise the following modification over the scheme known from GSMA RSP 22.

TABLE 1

Data objects for InitialiseSecureChannel Request

--Definition of data objects for InitialiseSecureChannel Request (modified version of the one in [GSMA_RSP])
InitialiseSecureChannelRequest ::= [35] SEQUENCE { -- Tag 'BF23'
    encVariant encVariant, -- (Conditional) Image Protection Package variant indi-
    cator. Used to distinguish the Encryption scheme (SCP03t or AES GCM). If not TABLE 1-continued Data objects for InitialiseSecureChannel Request

```
    present, Encryption SCP03t variant is assumed.
    remoteOpId RemoteOpId, -- Remote Operation Type Identifier (value SHALL
    be set to installBoundProfilePackage)
    transactionId [0] TransactionId, -- The TransactionID generated by the SM-DP+
    controlRefTemplate[6] IMPLICIT ControlRefTemplate, -- Control Reference
    Template (Key Agreement). Only part being used is the Key
    hostChallenge[1] OCTET STRING(16), --- Used for key derivation
    hostCryptogram[2] OCTET STRING(16) - Used to verify session establish-
    ment providing authentication for both entities.
    initialCounterValue[3] OCTET STRING(16), -- Used to define an initial MAC
    chaining value for SCP03t or initial counter value for the AES GCM securiza-
    tion of the image.
}
ControlRefTemplate ::= SEQUENCE {
    keyType[0] Octet1, -- Key type according to GlobalPlatform Card Specification
    [8] Table 11-16, AES= '88' , Tag '80'
    keyLen[1] Octet1, -- Key length in number of bytes. For current specification
    key length shall by 0x10 bytes, Tag '81'
    hostId[4] OctetTo16 -- Host ID value , Tag '84'
}
encVariant ::= [3] INTEGER {encScheme1(1), encScheme2(2)}
RemoteOpId ::= [2] INTEGER {broadcast(1), unicast(2)} - note that this one dif-
fers from the definition in [GPC_SPE_042]
    TransactionId ::= OCTET STRING (SIZE(1..16))
```

The scheme depicted in Table 1, according to a preferred embodiment, does not use ECC keys, and is based on the SCP03 session initialization as described in [GPAmdDv1.2]. The communication session is verified by authenticating the communication parties using an authentication scheme based at least on the host cryptogram within the binding header and the signatures for and within the manifest (i.e., first signature and second signature). The host cryptogram may to be verified and the procedure is aborted and an error is thrown if it does not match. Encryption variant type might be indicated here. If not present, a SCP03t-based encryption scheme, as for instance, the software protection scheme for package protection in FIG. 2, may be assumed.

In a further aspect of the present invention, there is provided an update agent 110 for use in a secure element 100 to install a software update on the secure element 100. The update agent may be the update agent 100 depicted in FIG. 1. The update agent is configured to implement a security scheme such as the security scheme depicted in FIG. 2, though the method depicted in FIG. 6.

Figure 6:
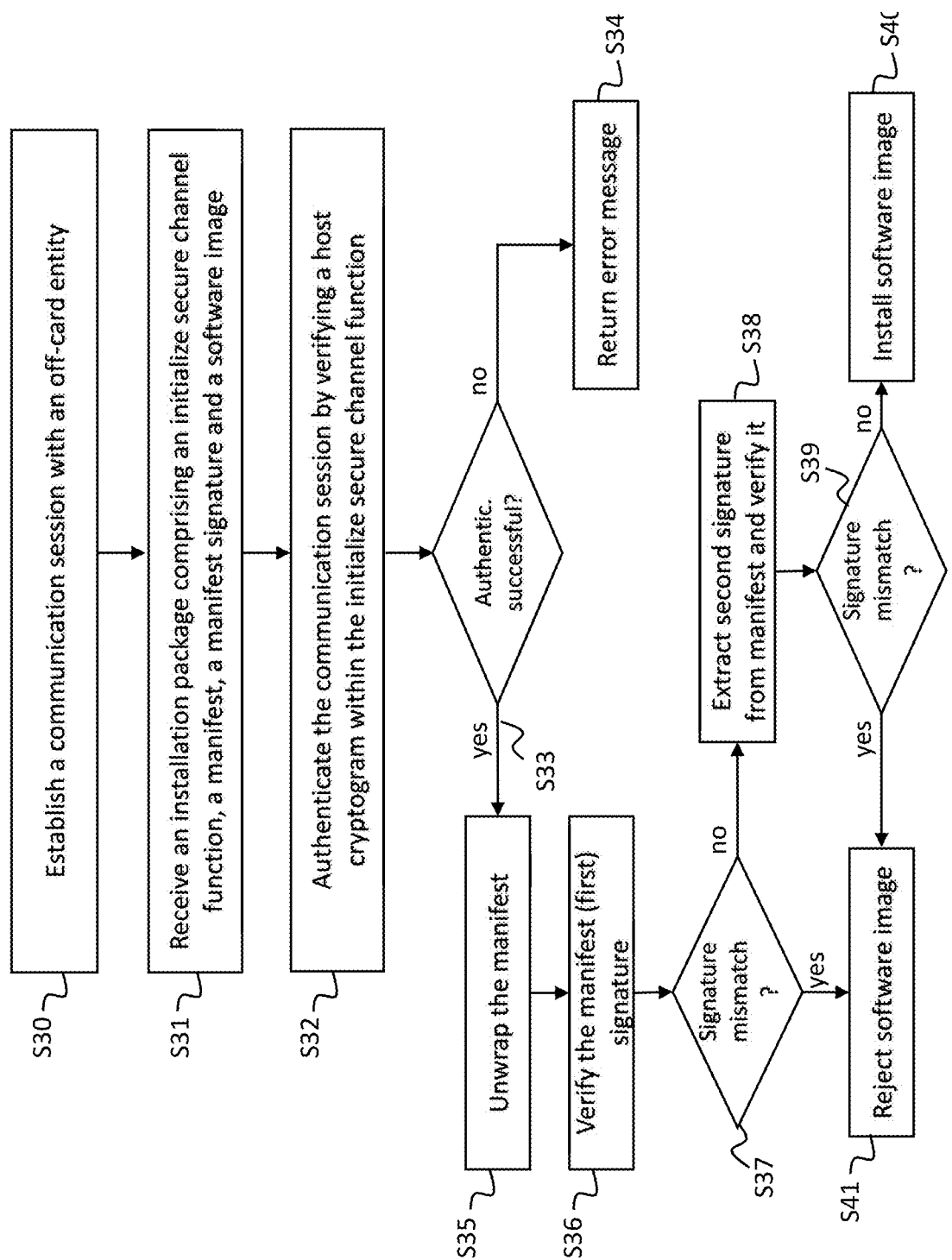
FIG. 6 shows a flow chart of a method for performing software updates at a secure element according to an embodiment.

FIG. 6 shows a flow chart of a method for performing software updates at a secure element according to an embodiment.

With reference to FIG. 6, in an initial step S30 the update agent 110 may establish with the off-card entity 300 a communication session. The communication session may be requested by the off-card entity, or by the secure element the update agent is located on.

After the communication session has been established, the update agent 110 may receive in step S31 an installation package 500. The installation package may be received segment-wise as the segmented bounded package 500 output-putted in stage V of the security scheme in FIG. 2. The installation package may contain a header part 530 and a payload part 520. The header part 530 may comprise an initialize secure channel function 532, while the payload part 520 may contain a manifest 502, a manifest signature 503 and a software image 501.

Upon receiving the header part 530 of the installation package 500, the update agent 110 may verify a host cryptogram within the initialize secure channel function to authenticate the communication session, in step S32.

In case that the authentication failed, an error message is returned in step S34 and the communication session may be aborted.

In case of a successful authentication of the communication session, the update agent may unwrap the manifest in step S35, and verify the manifest signature in step S36. Preferably, this is realized by implementing the GCM Authenticated Decryption function, which is an inverse of the authenticated encryption function implemented by the SM-DP+ server 300. Using this function, the ciphertext, that is the sequence of protected segments is decrypted into plaintext, and the authenticity of the ciphertext is verified.

In case of signature mismatch the software image is rejected in step S41.

In case the manifest signature (i.e., the first signature) has been successfully verified, the update agent checks the integrity of the payload by extracting the second signature 504 from the manifest 502 and verifying it in step S38.

This step may be implemented by the update agent by calculating a checksum over the received software image and comparing the calculated checksum with the extracted second signature 504.

In case of signature mismatch, that is the two checksums being different, the software image is rejected in step S41.

Otherwise, the software image in installed onto the secure element 100 in step S40.

The aspects and embodiments described herein provide an efficient and secure solution for managing the authentication of a software image issuer as well as a software image to be updated on a secure element.

The possibility to update the software in the secure element with this scheme would prove useful to update the OS in a secure element to keep up to date with the evolution of the market, as well as to provide patches and security and bug fixes at any point in the life cycle of the product. This modification on the previous solution allows for the update agent component to occupy less footprint, allowing it to target secure elements with less available memory.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method performed by an off-card entity for generating an installation package, comprising a header part and a payload part, for providing a software image to a secure element, the method comprising:

combining the software image with a manifest and a manifest signature, to obtain the payload part of the installation package; and providing a package binding function within the header part to link the installation package to the secure element;

wherein the manifest signature is a first signature generated using a block cipher algorithm;

wherein the manifest signature is generated using a Message Authentication Code (MAC) algorithm based on a symmetric key block cipher;

wherein the method further comprises generating a second signature for protecting the payload part and inserting the second signature in the manifest;

wherein the package binding function comprises an initializes secure channel function for opening a communication session with the secure element and a pair of image protection keys for software image encryption;

the method further comprising generating a third signature as a package binding signature to protect the initialize secure channel function and the pair of image protection keys and inserting the third signature into the header of the installation package;

wherein the manifest signature protects the entire manifest.

2. The method according to claim 1, wherein generating the second signature comprises calculating a checksum over the payload part.

3. The method of claim 2, wherein the second signature is a SHA-256 digest.

4. The method according to claim 1, wherein the third signature is a cipher-based Message Authentication Code, MAC, (MAC) generated using a MAC algorithm based on a symmetric key block cipher.

5. The method according to claim 1, wherein one or more of the first signature and the third signature has a length of 16 bytes.

6. The method according to claim 1, wherein the initialize secure channel function comprises at least a host cryptogram for verifying the communication session established between the off-card entity and the secure element.

7. A non-transitory computer-readable medium storing instructions for an update agent which, when executed by a secure element, installs a software image on the secure element, the update agent being configured to:

receive through a communication session established with an off-card entity an installation package according to claim 1, comprising an initialize secure channel function, a manifest, a manifest signature and a software image;

authenticate the communication session by verifying a host cryptogram within the initialize secure channel function; and verify integrity of the software image if the communication session has been authenticated or return an error message otherwise.

8. The non-transitory computer-readable medium according to claim 7, wherein the update agent is further configured to verify integrity of the software image by:

unwrapping the manifest;

verifying the manifest signature; and rejecting the software image in case of signature mismatch, otherwise accepting the software image to be installed on the secure element.

9. The non-transitory computer-readable medium according to claim 8, wherein the update agent is further configured to calculate a checksum over the received software image, to compare the calculated checksum with the second signature extracted from the manifest, and to reject the software image in case of signature mismatch, otherwise to accept the software image to be installed on the secure element.

10. A server configured to provide protected software updates to a secure element through an installation package, the server comprising at least one processor and a non-transitory memory storing instructions that, when executed by the at least one processor, being configured to generate the installation package from a software image by:

combining the software image with a manifest and a manifest signature, to obtain a payload part of the installation package, wherein the manifest signature is generated using a block cipher algorithm;

providing a package binding function within a header part to link the installation package to the secure element;

wherein the package binding function comprises an initialize secure channel function for opening a communication session with the secure element and a pair of image protection keys for software image encryption; and transmitting the installation package to an update agent on the secure element;

generating a second signature for protecting the payload part and inserting the second signature in the manifest;

generating a third signature as a package binding signature to protect the initialize secure channel function and the pair of image protection keys, and inserting the third signature into the header of the installation package;

wherein the manifest signature is a first signature generated using a block cipher algorithm;

wherein the manifest signature protects the entire manifest.

* * * * *